United States Patent [19]

Bianchetta

[11] 4,354,420
[45] Oct. 19, 1982

[54] FLUID MOTOR CONTROL SYSTEM PROVIDING SPEED CHANGE BY COMBINATION OF DISPLACEMENT AND FLOW CONTROL

[75] Inventor: Donald L. Bianchetta, Coal City, Ill.

[73] Assignee: Caterpillar Tractor Co., Peoria, Ill.

[21] Appl. No.: 116,741

[22] PCT Filed: Nov. 1, 1979

[86] PCT No.: PCT/US79/00928

§ 371 Date: Nov. 1, 1979

§ 102(e) Date: Nov. 1, 1979

[87] PCT Pub. No.: WO81/01311

PCT Pub. Date: May 14, 1981

[51] Int. Cl.³ .............................................. F01B 25/02
[52] U.S. Cl. .......................................... 91/6; 60/421; 60/426; 60/486; 60/484; 91/510
[58] Field of Search ............... 91/6, 510, 522; 60/421, 60/484, 486, 445, 426

[56] References Cited

U.S. PATENT DOCUMENTS

| | | | |
|---|---|---|---|
| 3,922,855 | 12/1975 | Bridwell | 60/484 |
| 4,011,920 | 3/1977 | Bianchetta | 60/484 |
| 4,023,364 | 5/1977 | Bianchetta | 60/484 |
| 4,024,710 | 5/1977 | Zelle | 60/484 |
| 4,055,046 | 10/1977 | Schernayder | 60/486 |
| 4,073,141 | 2/1978 | Lohbaver | 60/486 |
| 4,078,681 | 3/1978 | Field, Jr. | 60/421 |
| 4,087,968 | 5/1978 | Bianchetta | 60/484 |
| 4,096,694 | 6/1978 | Habiger | 60/486 |
| 4,112,821 | 9/1978 | Bianchetta | 91/6 |
| 4,140,196 | 2/1979 | Brewer | 60/484 |
| 4,189,921 | 2/1980 | Knapp | 60/445 |
| 4,194,362 | 3/1980 | Nonnenmacher | 60/445 |
| 4,195,479 | 4/1980 | Dezelan | 60/445 |

Primary Examiner—Abraham Hershkovitz
Attorney, Agent, or Firm—Phillips, Moore, Weissenberger, Lempio & Majestic

[57] ABSTRACT

A fluid motor control system (11) assures that automatic changes of motor displacement, which are initiated by occurrence of a predetermined operational condition in the system (11), result in a change of motor speed of the desired magnitude. Flow adjustment elements (76) respond to a displacement increase by reducing the flow of working fluid available to the motor or motors (12, 13) and respond to a motor displacement reduction by increasing the available flow. In one specific form, the system (11) controls a pair of right and left side vehicle drive motors (12, 13) and automatically increases motor displacements while reducing the fluid flow supplied to the motors (12, 13) to reduce travel speed during a turn of travel direction.

6 Claims, 1 Drawing Figure

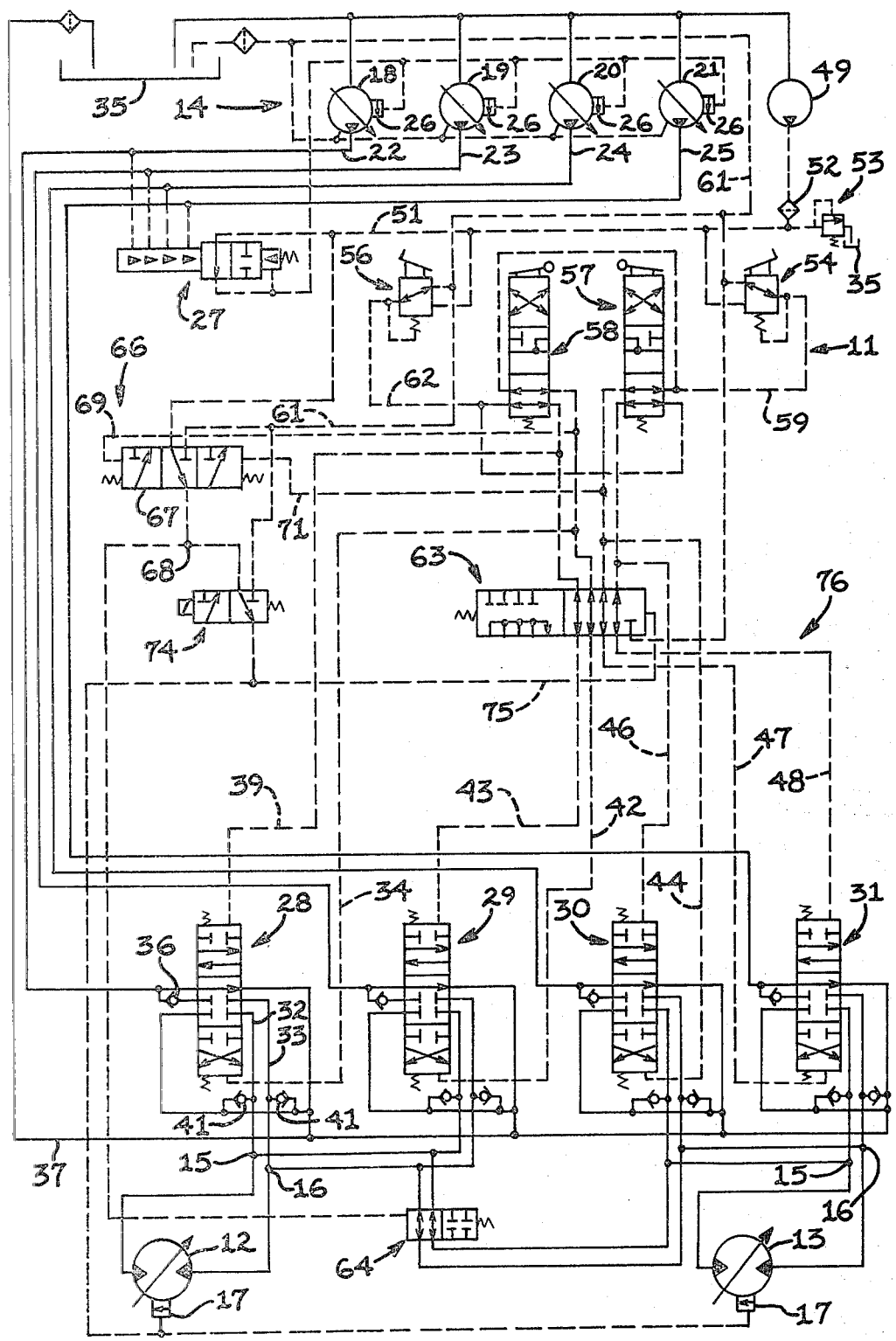

FLUID MOTOR CONTROL SYSTEM PROVIDING SPEED CHANGE BY COMBINATION OF DISPLACEMENT AND FLOW CONTROL

DESCRIPTION

1. Technical Field

This invention relates to control systems for fluid pressure driven motors and more particularly to the control of motors in which displacement may be changed to vary motor speed or torque.

In one specific form the invention relates to control systems for plural fluid motors which propel a vehicle and in which an automatic reduction in vehicle speed is desirable under a specific operating condition such as, for example, when the vehicle is undergoing a turn.

2. Background Art

Control of the speed of a fluid motor may be accomplished by varying the rate of flow of working fluid through the motor or by varying the displacement of the motor. Some fluid pressure driven systems use both speed control techniques. In some hydrostatic drive vehicles, for example, motor displacement is shifted in steps to provide for plural speed ranges while flow regulation enables continuous selective variation of speed within each such range.

The extent of speed change that can be realized by adjusting the displacement of fluid motors has in many cases been undesirably limited and subject to imprecision. While this may result in part from practical limitations on the size and complexity of the fluid motor that restrict the range of displacement change that can be designed into the motor, the problem is often aggravated by an effect which tends to reduce the magnitude of the speed change which is realized by a given change of displacement and to do so in a variable and somewhat unpredictable manner. In particular, certain characteristics of the pressurized fluid sources which supply working fluid to the motor tend to counteract the effect of a given displacement change in the motor.

The pressurized fluid sources which are commonly used to supply working fluid to fluid motors are often arranged to maintain a constant output pressure by varying output flow in accordance with changes of demand for fluid by the motor. One common form of pressurized fluid source includes one or more variable displacement pumps each of which is controlled by a pressure compensator that automatically adjusts the pump displacement as necessary to maintain a constant output pressure during periods of variable demand. If motor displacement is increased to reduce motor speed and if the pressure compensated pump is not at that time delivering the maximum possible flow, then the pressure compensator senses an incipient output pressure drop and reacts by increasing pump displacement and therefore the output flow from the pump. The increased flow of working fluid which is then available to the motor at least partially offsets the speed reducing effect of the motor displacement increase. An opposite but otherwise similar effect occurs if motor displacement is reduced with the intention of increasing motor speed. The pressure compensator at the pump reacts by reducing pump output flow. Consequently, the increase of motor speed is less than would otherwise be expected.

This reduction of the speed changing effect of motor displacement adjustments is not confined to systems using pressure compensated pumps. Another common form of pressurized fluid source has one or more fixed displacement pumps. To limit the output pressure to a predetermined maximum, one or more relief valves discharge a portion or all of the output flow from the pumps back to tank except at times when demand by the motor or other fluid powered devices supplied by the source exceeds the maximum output flow of the pump. If motor displacement is increased to reduce speed, less fluid discharges through the relief valve and more becomes available to the motor with the result that the resulting speed reduction is again less than would otherwise be the case. If motor displacement is reduced, an increased proportion of the output flow of the pump may discharge through the relief valve with the result that the increase of motor speed is again less than would be realized under constant flow conditions.

These effects undesirably limit the range of motor speed change which can be realized by motor displacement adjustment. Further, such effects introduce imprecisions and unpredictability into control of motor speed by displacement change since the magnitude of the effect is dependent on variable external factors such as the level of pump output flow in relation to maximum possible flow at the time that a motor displacement change is made.

Many motor control systems, including systems which rely on changes of motor displacement to accomplish speed changes, also include an operator's speed control for selectively varying the rate of flow of working fluid through the motor to control motor speed. The operator may counteract the effects discussed above during a change of motor displacement by adjusting the flow controlling speed control to assure that the displacement change results in the desired degree of motor speed change. It would be preferable in many systems of this kind if the effect could be counteracted without relying on operator action and without necessarily requiring that the setting of the operator's primary speed control be disturbed at the time that a change of motor displacement occurs. In some such systems, for example, it is preferable that changes of motor displacement, which will reliably produce a change of motor speed, occur automatically in response to some specific operating condition in the system.

Hydrostatic drive vehicles of the kind employed in earthworking operations, for example, are typically subject to the operational requirements and problems discussed above. Hydraulic excavators, for example, are often propelled by a pair of variable displacement fluid motors each driving a separate crawler track or the like at opposite sides of the vehicle. The operator's primary speed control enables selection of the rate and direction of fluid flow through both motors to control vehicle speed and direction. Steering controls enable selective reduction of the speed of one motor relative to the other to initiate a pivot turn and also enable reversing of one motor relative to the other to effect a spot turn. To establish a plurality of speed ranges, in order to extend the total available range of vehicle speeds and drive torques, means are provided for shifting the displacement of the motors in steps. While a manually operated control may be provided for actuating the motor displacement adjusting means to shift speed ranges, it is also desirable that such means be actuated automatically without reliance on the operator under certain circumstances. Specifically, it is desirable in hydraulic excavators, for example, that vehicle speed be automatically reduced during a turn both to assure stability and to avoid the overpressures and excessive torques which can otherwise occur in portions of a hydrostatic drive system during a turn. Automatic speed changes by motor displacement change have heretobefore tended to be undesirably limited in magnitude and variable in an unpredictable manner due in part to the counteractive effects of pressurized fluid sources as discussed above.

DISCLOSURE OF INVENTION

The present invention is directed to overcoming one or more of the problems as set forth above.

In one aspect of the invention, a control system is provided for at least one fluid motor which is driven by pressurized working fluid and which has displacement adjustment means for changing the displacement of the motor to provide for speed changes. The control system has control means for automatically actuating the displacement adjustment means upon occurrence of a predetermined condition, a manually operable motor speed control valve means for selectively varying the rate of flow of said working fluid to the motor and includes at least one additional manually actuatable control means for selectively initiating the predetermined condition and is further provided with flow adjusting means for reducing the flow of working fluid which is available to the motor when the displacement of the motor is increased and for increasing the flow of working fluid available to the motor when the displacement of the motor is decreased. The flow adjusting means is also actuated by the control means upon occurrence of the predetermined condition. The control means senses actuation of the additional control means and responds by causing the displacement adjustment means to increase the displacement of the motor and by causing the flow adjusting means to reduce the flow of working fluid available to the motor.

By automatically changing the flow of working fluid to a fluid motor in conjunction with an automatic change of motor displacement, the invention assures that an automatic change of motor speed of the desired magnitude is brought about. This is accomplished without relying on direct operator action for this purpose and without necessarily requiring any disturbance of the primary motor speed controls. In instances where the motor propels a vehicle, the invention provides a more reliable automatic speed reduction under a predetermined operational condition such as during periods when the vehicle is undergoing a turn.

DESCRIPTION OF THE DRAWING

The accompanying drawing is a fluid circuit diagram depicting a fluid motor control circuit in accordance with an embodiment of the present invention.

BEST MODE OF CARRYING OUT THE INVENTION

Referring to the drawing, the invention is shown embodied in a fluid motor control system 11 for controlling a first variable displacement fluid motor 12 and a second variable displacement fluid motor 13 which are driven by pressurized working fluid from a pressurized fluid source 14.

While the invention is adaptable to other usages, the control system 11 of this embodiment was designed for use in a hydraulic excavator vehicle of the kind described in U.S. Pat. No. 4,078,681, issued Mar. 14, 1978, to Jesse L Field, Jr. In that working context, the first motor 12 drives a crawler track at the left side of the vehicle while the second motor 13 drives a crawler track at the right side of the vehicle and to facilitate an understanding of this example of the invention, first motor 12 will hereinafter be referred to as the left motor while second motor 13 will be referred to as the right motor. These directional terms should be understood to be for purposes of illustration only and should not be considered to be limitative of the invention.

Fluid motor control system 11 provides for selective synchronous variation of the speed of the two motors 12 and 13 to control vehicle travel speed and also provides for synchronously reversing both motors to reverse the direction of travel of the vehicle. The control system 11 further enables selective variation of the speed of one of the motors 12 or 13 relative to that of the other in order to effect turns in the direction of vehicle travel. To provide for spot turns as well as pivot turns, the control system 11 also enables a temporary reversing of either motor 12 or 13 relative to the other motor.

Control system 11 further enables manually initiated shifting of the motors 12 and 13 between a high speed range and a low speed range by changes of the displacement of both motors. In addition, the control system 11 automatically shifts the motors 12 and 13 to a predetermined speed range, if the motors are not already at that speed range, upon occurrence of a predetermined condition. More specifically, in this particular example, the control system 11 automatically downshifts the motors 12 and 13 to the high displacement, low speed range, if the motors are not already at that range, when there is a difference of speed between the two motors 12 and 13 which condition occurs when the vehicle is undergoing a turn.

To provide for the several modes of operation outlined above, each of the motors 12 and 13 is of the known form having a pair of working fluid ports 15 and 16 and which operates in one direction, hereinafter termed the forward direction, when pressurized working fluid is transmitted to a first port 15 and discharged through the second port 16. Each motor 12 and 13 operates in the opposite direction, hereinafter termed the reverse direction, when the pressurized working fluid is transmitted to the second port 16 and fluid is allowed to discharge through the first port 15.

Each motor 12 and 13 is a variable displacement motor of the type in which two different motor displacement settings are possible, each motor being shiftable from a high displacement, low speed range condition to a relatively low displacement, high speed range condition by application of pilot fluid pressure to displacement adjustment means 17 at each motor. Upon release of the pilot pressure from displacement adjustment means 17, such motors shift back to the low speed or high displacement condition.

In some fluid driven motor systems such as the hydraulic excavator vehicles discussed above, the drive motors 12 and 13 must be very large and have a high output power rating. Single pumps with a sufficiently high output capacity to supply both motors and, in some cases, to supply other fluid actuated devices on the vehicle as well may not be readily obtainable and if available are of inconveniently large size and subject to other practical problems. In part to avoid these problems the pressurized fluid source 14 of the present embodiment has a plurality of relatively small pumps. These include first, second, third and fourth pumps 18, 19, 20 and 21 respectively which collectively have a maximum output capacity sufficient to drive both motors 12 and 13 at rated power output and to drive other fluid actuated components of the vehicle as well. The pumps 18 to 21, which may be driven by the engine of the hydraulic excavator vehicle or by other suitable drive means, withdraw working fluid such as oil or the like from a tank 35 and each such pump 18, 19, 20 and 21 delivers the fluid under pressure to a separate pump output line 22, 23, 24 and 25 respectively.

To establish a maximum working fluid pressure and in order to vary the output flow from pumps 18 to 21 in response to variation in demand for working fluid by the motors 12 and 13, each such pump is of the variable displacement type which is equipped with a pressure compensator 26. Pressure compensators 26 are of the known form which reduce the displacement of the associated pump when an output pressure feedback signal reaches a predetermined limit and which increase pump displacement when the feedback signal falls below that limit. The feedback signal pressure is applied to each compensator 26 through a summing valve 27.

Summing valve 27 receives pilot fluid having a constant predetermined pressure through a pilot pressure supply line 51 which connects with a pilot fluid pump 49 through a filter 52. The predetermined pilot fluid pressure, typically substantially lower than the maximum output pressures of the motor supply pumps 18 to 21, is established and maintained by a relief valve 53 connected between line 51 and tank 35.

Summing valve 27 is a modulating valve, spring biased towards a closed position at which pilot pressure line 51 is blocked from the pressure compensator 26 of each pump 18 to 21, the spring bias force being supplemented by a feedback fluid force proportional to the pressure which is being applied to the pressure compensators 26 through the summing valve. Such forces, acting to close the summing valve 27, are opposed by a counterforce proportional to the combined output pressures of the pumps 18 to 21 which counterforce acts to urge the summing valve towards an open position at which pilot pressure line 51 is communicated with the pressure compensators 26 to reduce the displacements of each pump 18 to 21. Thus the displacements of the pumps 18 to 21 are automatically adjusted as necessary to limit the combined output pressures of the pumps to a predetermined value.

Although a crossover or sharing of working fluid is provided for under certain conditions to be described, first and second pumps 18 and 19 primarily supply working fluid for the first or left motor 12 while the third and fourth pumps 20 and 21 primarily provide fluid for the second or right motor 13. To start and stop the left motor 12 and to control the direction and speed of the first motor, a first directional control valve 28 is connected between the first pump output line 22 and ports 15 and 16 of motor 12 and a second directional control valve 29 is connected between output line 23 of the second pump 19 and the same ports 15 and 16 of the same motor 12. A third directional control valve 30 is connected between ports 15 and 16 of the second or right motor 13 and output line 24 of the third pump and a fourth directional control valve 31 is connected between the same ports of motor 13 and the fourth pump output line 25. As the four directional control valves 28 to 31 are of similar type only the first directional valve 28 will be described in detail for purposes of example.

First directional control valve 28 is a three position pilot pressure operated valve, spring biased to a center position at which the first pump output line 22 is opened to tank 35 through a drain line 37 and in which the lines 32 and 33 from valve 28 to the ports 15 and 16 respectively of the left motor 12 are closed.

Pressurization of a forward drive pilot line 34 shifts the directional control valve 28 to a forward drive position at which first port 15 of left motor 12 is communicated with first pump output line 22 through a load check valve 36 while the second port 16 of the same motor is communicated with drain line 37, the degree of communication in both respects being a function of the level of pilot pressure applied to pilot line 34 up to the point where the directional control valve 28 is fully shifted to the forward drive position.

Similarly, pressurization of a reverse drive pilot pressure line 39 shifts directional control valve 28 into a third or reverse drive position to a degree dependent on the magnitude of the pressure in the pilot line 39. At the reverse drive position, valve 28 communicates the second port 16 of left motor 12 with first pump output line 22 through the load check valve 36 while communicating the first motor port 15 with drain line 37.

Separate anticavitation check valves 41 are connected between the drain line 37 and lines 32 and 33 of directional control valve 28 to prevent negative pressures from developing in the first motor circuit. The anticavitation valves 41 enable a return of fluid from the drain line 37 to either motor port 15 or 16 if a abnormal lowering of pressure occurs due to an overrunning condition of the motor such as can be caused by gravity induced motion of a vehicle down a slope at a faster rate than is provided for by the incoming fluid flow through the directional valve 28.

The second directional valve 29 is identical to valve 28 except that it is connected between the second pump output line 23 and the ports 15 and 16 of the first motor and is responsive to pilot pressures from a separate forward drive pilot line 42 and reverse drive pilot line 43. Third directional control valve 30 is connected in a similar manner bewteen the third pump output line 24, drain line 37 and the ports 15 and 16 of the right motor 13 and is responsive to pilot pressures from still another forward drive pilot line 44 and another reverse drive pilot line 46. Fourth directional control valve 31 is connected in a similar manner between the fourth pump output line 25, drain line 37 and ports 15 and 16 of the right motor 13 but is operated by pilot pressures from still another forward drive pilot line 47 and another reverse drive pilot line 48.

Thus the first or left motor 12 may be started up and caused to operate at a selected speed in the forward drive direction by selective pressurization of one or both of forward drive pilot lines 34 and 42. The left motor 12 may be caused to operate in a reversed direction at a selected speed by selective pressurization of one or both of pilot lines 39 and 43. The second or right motor 13 may be operated in the forward drive direction by pressurizing one or both of pilot lines 44 and 47 and may be caused to operate in the reversed direction at a selected speed by a controlled pressurization of one or both of pilot lines 46 and 48.

Circuit components which are actuated by the operator to control the directional control valves 28 to 31 and to thereby control the motors 12 and 13 include a forward drive valve 54, a reverse drive valve 56, a right turn steering valve 57 and a left turn steering valve 58. Forward and reverse drive valves 54 and 56 in this particular embodiment are foot pedal operated while steering valves 57 and 58 are hand lever operated but other forms of manual or romote valve control can be used in each instance according to what is most convenient for the operator in the particular working context.

Forward drive valve 54 is connected between pilot pressure supply line 51 and both the right and left steering valves 57 and 58 through a branched forward drive line 59 and has an unactuated position at which the forward drive line 59 is vented to tank 35 through a pilot fluid drain line 61. The forward drive valve 54 is a pressure regulating valve, suitable constructions for which are known to the art, which may be actuated to pressurize forward drive line 59 to any selectable pressure up to the maximum provided by the supply line 51. Reverse drive valve 56 is of the same type and is connected between pilot pressure supply line 51 and a reverse drive line 62 which has branches communicated with both the right and left steering valves 57 and 58. Reverse drive valve 56 has an unactuated position at which line 62 is opened to tank 35 through drain line 61 and may be actuated to pressurize the reverse drive line 62 to a selectable pressure.

Right and left steering valves 57 and 58 are three position valves and each is spring biased towards a first or unactuated position. At the first position, left steering valve communicates forward and reverse drive lines 59 and 62 with the forward and reverse pilot lines 34 and 39 respectively of the first directional valve 28. At the first position the left steering valve 58 also communicates the forward and reverse drive lines 59 and 62 with the forward and reverse pilot lines 42 and 43 respectively of second directional control valve 29 through a pump selector valve 63, to be hereinafter discussed in more detail, provided that the selector valve is in a piloted condition.

Right steering valve 57, at the first position communicates forward and reverse drive lines 59 and 62 with forward and reverse pilot lines 44 and 46 respectively of the third directional control valve 30 and with forward and reverse pilot lines 47 and 48 respectively of the fourth directional control valve 31, provided that the pump selector valve 63 is in the piloted position.

Thus if the left and right steering valves 57 and 58 are unactuated and forward and reverse drive valves 54 and 56 are also unactuated, thereby opening forward and reverse drive lines 59 and 62 to drain, pilot pressures are vented from both ends of each of the directional control valves 28 to 31 and both motors are stopped.

Provided both steering valves 57 and 58 remain unoperated, actuation of forward drive valve 54 pilots the directional control valves 28 to 31 to initiate synchronous operation of the right and left motors 12 and 13 in the forward drive direction. The pressurization of forward drive line 59 resulting from actuation of forward drive valve 54 is transmitted through left steering valve 58 to forward drive pilot line 34 of first directional valve 28 and, through the piloted selector valve 63, to the forward drive pilot line 42 of second directional control valve 29. Similarly, the same pressure is transmitted through right steering valve 57 to forward drive pilot line 44 of third directional control valve 30 and is further transmitted through selector valve 63 to forward drive pilot line 47 of the fourth directional control valve 31.

Under the above described conditions, the output of all four pumps 18 to 21 is available to drive the motors 12 and 13. While the first and second pumps 18 and 19 primarily supply the left motor 12 and the third and fourth pumps 20 and 21 primarily supply the right motor 13, a crossover or interchange of fluid between the two motor circuits is provided for under the above described operating conditions to assure synchronization of the motors. In particular, a two position pilot operated crossover valve 64 is connected between the ports 15 and 16 of motor 12 and the corresponding ports 15 and 16 of motor 13. Crossover valve 64 has a piloted position at which the forward drive ports 15 of both motors 12 and 13 are intercommunicated and at which the reverse drive ports 16 of both motors are also intercommunicated. At the unpiloted position of crossover valve 64, the intercommunications between corresponding ports of the two motors 12 and 13 is blocked and asynchronous operation of the motors is possible.

Provided that the steering valves 57 and 58 still remain unoperated, actuation of the operator's reverse drive valve 56 pressurizes reverse drive line 62 which pressurization is transmitted to the reverse drive pilot lines 39 and 43 of the first and second directional control valves 28 and 29 respectively while right steering valve 57 transmits such pressurization to the reverse drive pilot lines 46 and 48 of the third and fourth directional control valves 30 and 31 respectively. Thus the effects of actuation of the reverse drive valve 56 are essentially similar to those of actuation of the forward drive valve 54 except insofar as the directional control valves 28 to 31 are piloted in an opposite direction to cause reversed operation of the motors 12 and 13.

Operation of steering valves 57 or 58 enables either of the motors 12 and 13 to be selectively slowed or reversed relative to the other. Slowing of one motor relative to the other produces a pivot turn about a turning radius depending on the degree of the relative slowing while reversal of one motor relative to the other produces a spot turn.

To slow left motor 12 relative to right motor 13, left steering valve 58 is shiftable towards a second position at which the communications of the forward and reverse pilot lines 34 and 39 respectively of first directional control valve 28 with forward and reverse drive lines 59 and 62 respectively are progressively decreased and the two pilot lines 34 and 39 are increasingly intercommunicated with each other. This progressively reduces the pilot pressure differential at opposite ends of first directional control valve 28 to selectively reduce the flow of working fluid to the left drive motor 12. The actuation of the left steering valve 58 also shifts both pump selector valve 63 and crossover valve 64 as will hereinafter be described in more detail.

Further operation of the left side steering valve 58 toward a third position reverses the original communication of forward and reverse drive lines 59 and 62 with the forward and reverse pilot lines 34 and 39 respectively of the first directional valve 28. This reverses the pilot pressures at the first directional control valve 28 causing a reversal of the direction of operation of the left motor 12 only.

Right steering valve 57 is essentially similar to the left steering valve 58 and enables similar relative slowing or reversal of the right motor 13. Movement of right steering valve 57 toward the second position progressively reduces the communications between forward and reverse drive lines 59 and 62 and forward and reverse pilot lines 44 and 46 respectively while establishing a progressively greater intercommunication between the two pilot lines 44 and 46. Further operation of the right steering valve 57 toward the third position reverses the original intercommunications between forward and reverse drive lines 59 and 62 and the forward and reverse pilot lines 44 and 46 respectively of the third control valve. The actuation of the right steering valve 57 also shifts selector valve 63 and crossover valve 64, as will hereinafter be described in greater detail, to release pilot pressure from fourth directional valve 31 and to enable the desired asynchronous operation of the motors 12 and 13.

Displacement control means 66 conditionally applies pilot pressure to the displacement adjustment means 17 of the two motors 12 and 13 to shift the motors from the high displacement low speed range to the low displacement high speed range. Displacement control means 66 provides for both manual selection of the speed range and also for an automatic shift of the motor displacements upon occurrence of a predetermined condition, the condition in this embodiment being that a steering valve 57 or 58 has been actuated to cause a difference in the speeds of the two motors 12 and 13 which condition is indicative that the controlled vehicle is undergoing a turn.

Displacement control means 66 includes a three position condition sensing valve 67 which is spring biased towards an unpiloted, centered position at which pilot pressure from supply line 51 is transmitted to a flow junction 68. A pilot connection 69 to one end of condition sensing valve 67 is communicated with forward drive pilot line 34 of the first directional control valve 28 while another pilot connection 71 to the opposite end of the valve 67 communicates with the forward drive pilot line 44 of third directional control valve 30. As the forward drive pilot lines 34 and 44 of the first and third directional control valves 28 and 30 respectively are similarly pressurized at times when the speeds of the two motors 12 and 13 are the same, the condition sensing valve 67 remains at its centered position and pressurizes flow junction 68 at such times.

During asynchronous operation of the two motors 12 and 13, the pressures in forward drive pilot lines 34 and 44 of the first and third directional control valves 28 and 30 respectively are unbalanced due to the actuation of one or the other of the steering valves 57 and 58 as previously described. This pressure differential pilots condition sensing valve 67 away from the centered position to one of the two additional positions at each of which the valve 67 vents pilot pressure from flow junction 68 into the pilot fluid drain line 61. Thus flow junction 68 is pressurized when the operation of motors 12 and 13 is synchronous and is unpressurized when the motor speeds are different. A manually controlled two position speed range selector valve 74 is spring biased to a first position at which flow junction 68 is communicated with the displacement adjustment means 17 of both motors 12 and 13 and also with the pilot line 75 of pump selector valve 63. Thus if neither steering valve 57 or 58 is actuated and therefore condition sensing valve 67 is at its centered position and provided that manual speed range selector valve 74 is at its first position, pilot pressure is transmitted from supply line 51 to the pump selector valve 63 and to the displacement adjustment means 17 of both motors 12 and 13. Under those conditions, selector valve 63 is piloted and the pilot lines 42 and 43 of second directional control valve 29 are communicated with the corresponding pilot lines 34 and 39 of the first directional control valve while the pilot lines 47 and 48 of the fourth directional control valve 31 are communicated with the corresponding pilot lines 44 and 46 of the third directional control valve 30. Accordingly the output of all of the four supply pumps 22 to 25 is available to drive the motors 12 and 13. Also under those conditions, the pressurization of the displacement adjustment means 17 of the two motors 12 and 13 holds the motors in the low displacement, high speed range condition. Pilot pressure from flow junction 68 is also transmitted to the crossover valve 64 so that under the above described conditions fluid may be exchanged between the two motor circuits to assure synchronous speeds.

INDUSTRIAL APPLICABILITY

The fluid motor control system 11 described above enables operator control of right and left drive motors 12 and 13 of a vehicle and further functions to reduce the speed of the vehicle automatically during a turn of the vehicle if the drive motors 12 and 13 are not already at the low speed range. The invention may also be adapted to the control of other fluid motor driven systems, which need not necessarily be vehicles, in which it is desired to provide for an automatic change of speed of one or more fluid motors in response to a predetermined specific operating condition.

In the operation of the motor control system 11 depicted in the drawing, each of the four directional control valves 28 to 31 receives no pilot pressure at either end if both the operator's forward drive valve 54 and reverse drive valve 56 are unactuated. Under that condition, the forward drive line 59 and reverse drive line 62 are vented back to tank through valves 54 and 56 respectively. Also under that condition, the directional control valves 28 to 31 assume their spring centered positions and discharge the output flow from all four pumps 22 to 25 back to tank 35 while closing the working fluid ports 15 and 16 of both motors and thereby immobilizing both motors. Provided that both steering valves 57 and 58 are also unactuated, the pilot pressures balance at the opposite ends of condition sensing valve 67 which is then spring centered to transmit pilot pressure to crossover valve 64 which is thereby held in the position at which exchange of fluid between the ports 15 and 16 of the two motors is possible. Provided that the manual speed range selector valve 74 is unoperated the pilot pressure from condition sensing valve 67 is also transmitted on through valve 74 to the displacement adjustment means 17 of both motors to hold the motors in the low displacement, high speed range. The pilot pressure transmitted through speed range selector valve 74 under this condition also pilots pump selector valve 63 to communicate the pilot lines 42 and 43 of second directional control valve 29 with the corresponding pilot lines 34 and 39 of the first directional control valve and to intercommunicate the pilot lines 44 and 46 of third directional control valve 30 with the corresponding pilot lines 47 and 48 of fourth directional control valve 31.

If the operator now actuates forward drive valve 54 the forward drive line 59 is pressurized to a selected level indicative of the desired motor speed. Such pressurization is transmitted through the unactuated left steering valve 58 to forward drive pilot line 34 of first directional control valve 28 and also, through selector valve 63 to forward drive pilot line 42 of the second directional control valve 29. The same pressure from forward drive line 59 is transmitted through right steering valve 57 to forward drive pilot line 44 of the third directional control valve 30 and, through selector valve 63 to the forward drive pilot line 47 of the fourth directional control valve 31. Concurrently, the left steering valve 58 vents pilot pressure from reverse pilot lines 39 and 43 of the first and second directional control valves 28 and 29 back to tank through the reverse drive line 62 and the unactuated reverse drive valve 56. Similarly, the right steering valve 57 vents the reverse pilot lines 46 and 48 of the third and fourth directional control valves 30 and 31 to tank through the reverse drive line 62 and unactuated reverse drive valve 56.

Accordingly all four directional control valves 28 to 31 are piloted to transmit working fluid from all four pumps 22 to 25 to the forward drive ports 15 of both motors 12 and 13. The motors 12 and 13 are thereby caused to operate synchronously in the forward drive direction at a speed which is regulatable by operator adjustment of the forward drive valve 54 to vary the magnitude of the pilot pressures being applied to the four directional control valves 28 to 31.

If during operation in the forward drive mode as described above, the left steering valve 58 is actuated toward the second position to initiate a pivot turn of the vehicle, the communication of pilot pressure with the forward pilot lines 34 and 42 of the first and second directional control valves 28 and 29 respectively is restricted to a selected extent. As the pilot pressures which are being supplied to the other two directional control valves 30 and 31 through the right steering valve 57 are unaffected, a pilot pressure imbalance occurs at condition sensing valve 67 which then shifts to depressurize flow junction 68. Depressurization of flow junction 68 shifts crossover valve 64 which then shifts to isolate the corresponding ports 15 and 16 of the two motors 12 and 13 from each other. This closing of crossover valve 64 enables asynchronous operation of the motors as is required to effect a turn of the vehicle.

Through shift control valve 74, the depressurization of flow junction 68 also unpilots the displacement adjustment means 17 of both motors 12 and 13 causing both motors to shift to the high displacement, low speed range mode of operation. Concurrently, the depressurization of flow junction 68 releases pilot pressure from pump selector valve 63 which then shifts to vent all pilot lines 42, 43, 47 and 48 of the second and fourth directional control valves 29 and 31. The unpiloted second and fourth directional control valves 29 and 31 then spring return to their centered positions and block the flow of working fluid from second pump 23 to left motor 12 and also block the flow of fluid from the fourth pump 21 to the right motor 13.

Thus concurrently, with the automatic change of displacement of the two motors 12 and 13, the flow of working fluid available to each such motor is also reduced automatically. As the flow of working fluid which is available to each motor 12 and 13 is substantially reduced concurrently with the increases of motor displacement, a very sizable and assured automatic reduction of motor speeds occurs. Pump selector valve 63 in conjunction with the second and fourth directional control valves 29 and 31 thus function as a flow adjusting means 76 for reducing the flow of working fluid which is available to the motors 12 and 13 when the motor displacements are increased.

It may be observed that the above described automatic downshifting of the motors 12 and 13 to the low speed range also occurs if the left steering valve 58 is actuated further toward the third position at which the direction of drive of left side motor 12 is reversed relative to that of the right side motor 13 to accomplish a spot turn of the vehicle. The unbalanced pilot pressures on condition sensing valve 67 remain present and the valve still depressurizes flow junction 68 to produce the speed reducing actions described above.

When at the completion of the turn of the vehicle, the operator deactuates the right steering valve 58, the steering valve returns to the original position and in the process balances the pilot pressures at opposite ends of condition sensing valve 67. Condition sensing valve 67 then returns to the centered position at which it pressurizes flow junction 68. This in turn pressurizes displacement adjustment means 17 of both motors 12 and 13 to automatically restore the low displacement high speed range mode of operation in both motors. This also shifts crossover valve 64 to again enable an interchange of working fluid between the two motors to assure synchronous operation and shifts pump selector valve 63 to restore pilot pressures at the second and fourth directional control valves 29 and 31. The second and fourth directional control 29 and 31 are thereby shifted to again make the working fluid outputs of second and fourth pumps 19 and 21 available to motors 12 and 13. Thus concurrently with the decreases of the displacements of motors 12 and 13 the flow adjusting means 76 increases the flow of working fluid available to both motors and thereby assures a sizable automatic increase of motor speeds at that time.

An essentially similar automatic speed reduction of both motors 12 and 13 occurs if it is the right steering valve 57 rather than the left steering valve 58 that is actuated except insofar as the pilot pressure imbalance experienced by condition sensing valve 67 is an opposite direction. As a shift of the condition sensing valve 67 in either direction away from the centered position acts to unpressurize flow junction 68, the practical effects remain the same as those described above with respect to the effects of operation of the left steering valve 58.

Similarly, essentially the same automatic downshifting of the motors 12 and 13 to reduce vehicle speed occurs if one or the other of the steering valves 57 or 58 is actuated at a time when the operator has actuated the reverse drive valve 56 to travel the vehicle in a reverse direction. With the reverse drive valve 56 operated, it is reverse drive line 62 which is pressurized while forward drive line 59 is unpressurized through the unactuated forward drive valve 54. Therefore, just prior to commencement of a turn of the vehicle, the forward directional control valves 28 to 31 are each piloted in an opposite direction relative to what was previously described and the direction of flow of working fluid through the motors 12 and 13 is opposite to that previously described. Actuation of either steering valve 57 or 58 under these reverse drive conditions again unbalances the pilot pressures at opposite ends of condition sensing valve 67 causing the valve 67 to again unpressurize flow junction 68. The unpressurization of flow junction 68 then results in an increase of displacement of the motors 12 and 13 accompanied by a decrease in the flow of working fluid available to the motors in the same manner as previously described with reference to turning of the vehicle during the forward drive mode of operation.

The change of motor speeds in response to turning of the vehicle is an automatic action which is not subject to the direct control of the operator except insofar as it is the operator who initiates the turn of the vehicle through the steering control valves 57 and 58. The motor control circuit 11 also provides means, defined by speed range selector valve 74, for enabling the operator to directly and selectively shift the motors 12 and 13 to the low speed range during straight travel of the vehicle. This is accomplished by actuating valve 74 to the second position at which the pilot pressure at displacement adjustment means 17 of both motors 12 and 13 and the pilot line 75 of pump selector valve 63 are unpressurized through pilot fluid drain line 61. Both motors 12 and 13 are thereby shifted to the high displacement low speed range while second and fourth directional control valves 29 and 31 are shifted to block the output of second and fourth pumps 19 and 21 from the motors thereby reducing the flow of working fluid available to the motors to assure that the displacement increase produces the desired degree of motor speed reduction. Speed range selector valve 74 is depicted as a solenoid operated valve in the drawing as it is often preferable that it be located close to the motors 12 and 13 and therefore remote from the other operator's controls. In instances where the speed range selector valve 74 is located in proximity to the other operator actuated controls, it may be push button operated or have other suitable actuating means.

Other aspects, objects and advantages of this invention can be obtained from a study of the drawing, the disclosure and the appended claims.

I claim:

1. A control system (11) for at least one fluid motor (12) which is driven by pressurized working fluid and which has displacement adjustment means (17) for changing the displacement of said motor (12) to provide for speed changes, the control system having control means (66) for automatically actuating said displacement adjustment means (17) upon occurrence of a predetermined condition, a manually operable motor speed control valve means (54) for selectively varying the rate of flow of said working fluid to said motor (12) and including at least one additional manually actuatable control means (58) for selectively initiating said predetermined condition, wherein the improvement comprises:

flow adjusting means (76) for reducing the flow of working fluid which is available to said motor (12) when the displacement thereof is increased and for increasing the flow of working fluid available to said motor (12) when the displacement thereof is decreased, said flow adjusting means (76) also being actuated by said control means (66) upon occurrence of said predetermined condition, and wherein said control means (66) senses actuation of said additional control means (58) and responds thereto by causing said displacement adjustment means (17) to increase the displacement of said motor (12) and by causing said flow adjusting means (76) to reduce the flow of working fluid available to said motor (12).

2. A control system (11) for controlling at least two fluid motors (12, 13) which are driven by pressurized working fluid and which have displacement adjustment means (17) for changing the displacement of said motors (12, 13), the control system having displacement control means (66) for automatically actuating said displacement adjustment means (17) upon occurrence of a predetermined condition wherein said predetermined condition is a slowing of the speed of one of said motors (12, 13) relative to the other thereof, wherein the improvement comprises:

flow adjusting means (76) for reducing the flow of working fluid which is available to said motors (12, 13) when the displacement thereof is increased and for increasing the flow of working fluid available to said motors (12, 13) when the displacement thereof is decreased, condition sensing means (67) for detecting asynchronous operation of said motors (12, 13) and for operating said displacement adjustment means (17) and said flow adjusting means (76) to reduce the speeds of both of said motors (12, 13) during said asynchronous operation thereof, manually operable valve means (57, 58) for selectively initiating said asynchronous operation of said motors (12, 13) and wherein said condition sensing means (67) senses actuation of said manually operable valve means (57, 58) and initiates operation of said displacement adjustment means (17) and said flow adjustment means (76) in response thereto.

3. A control system (11) for controlling at least two fluid motors (12, 13) which are driven by pressurized working fluid and which have displacement adjustment means (17) for changing the displacement of said motors (12, 13), the control system having displacement control means (66) for automatically actuating said displacement adjustment means (17) upon occurrence of a predetermined condition wherein said predetermined condition is a slowing of the speed of one of said motors (12, 13) relative to the other thereof, wherein the improvement comprises:

flow adjusting means (76) for reducing the flow of working fluid which is available to said motors (12, 13) when the displacement thereof is increased and for increasing the flow of working fluid available to said motors (12, 13) when the displacement thereof is decreased, condition sensing means (67) for detecting asynchronous operation of said motors (12, 13) and for operating said displacement adjustment means (17) and said flow adjusting means (76) to reduce the speeds of both of said motors (12, 13) during said asynchronous operation thereof, crossover valve means (64) for exchanging working fluid between said motors (12, 13), wherein said condition sensing means (67) closes said crossover valve means (64) to block exchange of working fluid between said motors (12, 13) upon detection of said asynchronous operation of said motors (12, 13).

4. A control system (11) for a plurality of fluid motors (11, 12) which are provided with pressurized working fluid by a greater plurality of pumps (18 to 21), each of said motors (12, 13) being shiftable between a low motor displacement setting and a high motor displacement, said control system (11) comprising:

first (28) and second (29) pilot operated control valves connected between a first (18) and a second (19) of said pumps and a first (12) of said motors, third (30) and fourth (31) pilot operated control valves connected between a third (20) and a fourth (21) of said pumps and a second (13) of said motors, synchronous drive initiating valve means (54) for transmitting a selectable pilot pressure to each of said pilot operated control valves (28 to 31) to cause working fluid from each of said first, second, third and fourth pumps (18 to 21) to be supplied to said motors (12, 13) to produce synchronous operation thereof, asynchronous motor operation initiating valve means (57, 58) for selectively varying the pilot pressure transmitted to either of said first (28) and said third (30) control valves relative to the pilot pressure transmitted to the other thereof to cause said motors to operate at different speeds, condition sensing valve means (67) for detecting a variation of the pilot pressure being transmitted to one of said first (28) and third (30) control valves relative to the pilot pressure being transmitted to the other thereof and for shifting said motors (12, 13) from said low displacement setting to said high displacement setting while one of said pilot pressures differs from the other thereof, and pilot pressure release valve means (63) for blocking transmission of said selectable pilot pressure to said second (29) and fourth (31) control valves concurrently with shifting of said motors (12, 13) from said low motor displacement setting to said high motor displacement setting to block the flow of working fluid to said motors (12, 13) from said second (19) and fourth (21) pumps while said motors (12, 13) are in the high motor displacement settings.

5. A control system (11) for a plurality of fluid motors (12, 13) as defined in claim 4 further including crossover valve means (64) for enabling an exchange of working fluid between said motors (12, 13) and wherein said condition sensing valve means (67) closes said crossover valve means (64) to block said exchange of working fluid during periods when one of said pilot pressures differs from the other thereof.

6. A control system (11) for a plurality of fluid motors (12, 13) as defined in claim 4 further including manually actuatable valve means (74) for selectively shifting said motors (12, 13) from said low displacement setting to said high displacement setting and for concurrently causing said pilot pressure release valve means (63) to block said selectable pilot pressure from said second (29) and fourth (31) control valves.

* * * * *